US000001178H

United States Statutory Invention Registration [19]

[11] Reg. Number: H1178

[43] Published: May 4, 1993

Zacharin

[54] ELECTRIC COUPLING

[75] Inventor: Alexey T. Zacharin, Denville, N.J.

[73] Assignee: The United States of America as represented by the Secretary of the Army, Washington, D.C.

[21] Appl. No.: 888,994

[22] Filed: May 27, 1992

[51] Int. Cl.[5] ..... F42C 11/02

[52] U.S. Cl. ..... 102/210; 102/202.14

[58] Field of Search ..... 102/210, 207, 202.14

[56] References Cited

U.S. PATENT DOCUMENTS

| | | | |
|---|---|---|---|
| 2,970,545 | 2/1961 | Howe | 102/210 |
| 3,963,966 | 6/1976 | Mohr | 317/81 |
| 4,037,538 | 7/1977 | Andrews et al. | 102/210 |
| 4,648,320 | 3/1987 | Furst et al. | 102/210 |
| 4,672,895 | 6/1987 | Bouchu | 102/206 |
| 5,040,463 | 8/1991 | Beaverson | 102/210 |
| 5,092,243 | 3/1992 | Hawkins et al. | 102/210 |

FOREIGN PATENT DOCUMENTS

| | | | |
|---|---|---|---|
| 2043340 | 3/1972 | Fed. Rep. of Germany | 102/210 |
| 7201875 | 8/1972 | Netherlands | 102/210 |

*Primary Examiner*—Stephen M. Johnson
*Attorney, Agent, or Firm*—Anthony T. Lane; Edward Goldberg; Michael Sachs

[57] ABSTRACT

The present invention is directed to an apparatus intended to allow detonation of munitions by the occurrence of a triggering event at a location remote from the actual munition. This apparatus contains a piezoelectric crystal which is deformed by the firing of a conventional blasting cap upon the happening of a triggering event. Deformation of the piezoelectric crystal generates an electric impulse sufficient to initiate an electric blasting cap thereby detonating the munition.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRIC COUPLING

The invention described herein may be manufactured, used and licensed by or for the Government for Governmental purposes without payment to me of any royalties thereon.

FIELD OF THE INVENTION

This invention relates to apparatus for the remote detonation of munitions.

BACKGROUND OF THE INVENTION

United States military munitions or demolition charges such as Claymore Mines are typically detonated through primarily mechanical means. In such applications, Demolition Firing Devices, hereinafter DFD, such as the M1 pull-type, the M1 release-type and the M1A1 pressure-type, to name a few, are attached to a blasting cap which is in turn attached directly to the munition. When the DFD is tripped by a triggering event such as pulling on a trip wire or application of pressure due to the weight of a man or vehicle, a firing pin strikes a percussion primer which thereby emits a small but intense flame. This flame in turn initiates a blasting cap. Initiation or firing of the blasting cap causes the munition to detonate. The blasting cap used in these applications by the U.S. military is the M7 nonelectric blasting cap. Although effective for traditional boobytraps, the mechanical links which must be maintained between the DFD, the M7 blasting cap and the munition itself, reduces the flexibility of application of munitions so detonated. In particular, it is advantageous in some situations, to locate the munition(s) to be detonated in a position remote from the triggering event.

To this end, electric blasting caps such as the M6 have been developed. Such electric blasting caps are initiated or fired by an electric impulse of at least 1.5 amperes in contrast to the mechanical initiation of the M7 blasting cap described above. In practice, the electric impulse necessary to fire the M6 electric blasting cap has, however, been generated by means requiring direct human intervention and may require human monitoring of a triggering event. Typically, the M6 electric blasting cap is initiated by the use of a "blasting machine". These devices are electric generators operated by hand by twisting of a handle or by pushing on a plunger. Such methods of initiating an M6 electric blasting cap are incompatible with traditional boobytraps in which munitions are caused to detonate without direct human intervention and monitoring.

OBJECTS OF THE INVENTION

It is, therefore, an object of this invention to provide an apparatus which allows placement of a munition remote from a triggering event but which will cause the munition to detonate without direct human intervention and monitoring.

In particular, it is the object of this invention to provide an apparatus to couple a DFD through an M7 or similar blasting cap to means for producing an electrical impulse sufficient to remotely initiate an M6 electric blasting cap thereby causing detonation of munitions.

SUMMARY OF THE INVENTION

The present invention is an electric coupling comprised of a housing which places an M7 nonelectric blasting cap in close proximity to means for generating electric energy such as a piezoelectric crystal. Upon the happening of a triggering event, the DFD mechanically initiates the M7 blasting cap thereby causing a deformation of the piezoelectric crystal. The deformation of the piezoelectric crystal generates an electric impulse sufficient to initiate the remotely located and electrically connected M6 electric blasting cap thereby detonating the munition.

DETAILED DESCRIPTION OF THE INVENTION

Figure 1:
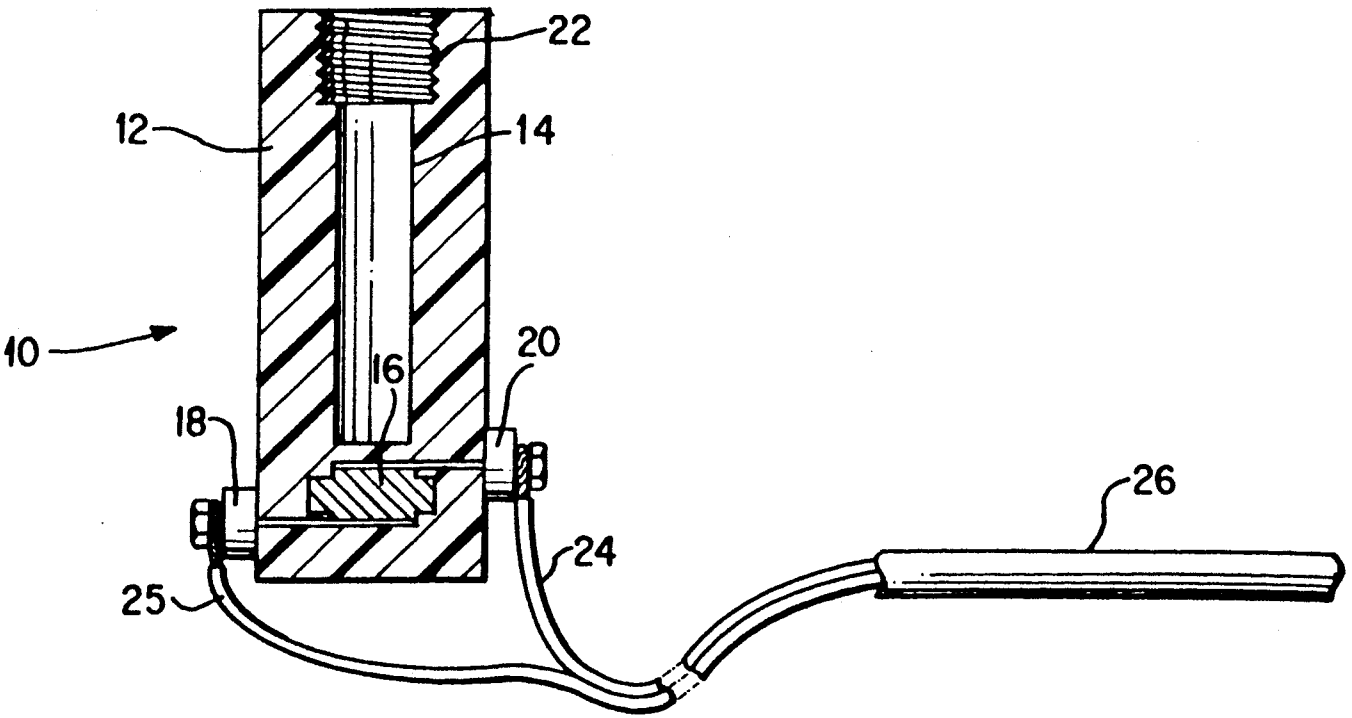
FIG. 1 is a cutaway view of my electric coupling electrically connected to an electric blasting cap.
Figure 2:
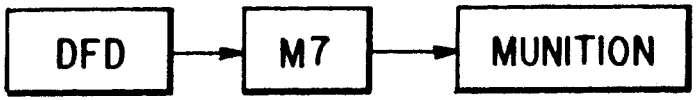
FIG. 2 PRIOR ART
FIG. 2 is a block diagram of the current state of the art interconnection of elements for the mechanical detonation of munitions.
Figure 3:
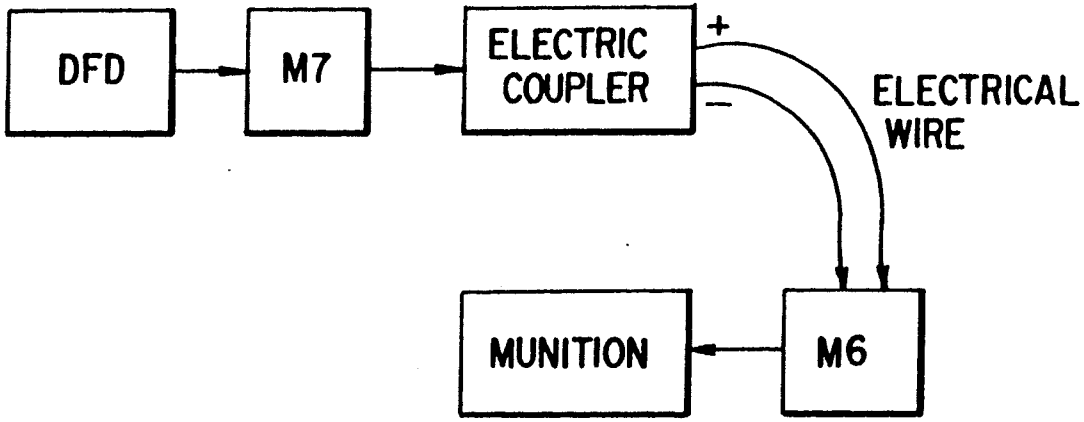
FIG. 3 is a block diagram of the interconnection of elements for the electrical detonation of munitions using my invention.

The electric coupling which is the subject matter of the present invention is substantially as shown in FIG. 1. The preferred embodiment of the invention is comprised of a housing 12, a well 14 disposed therein, a piezoelectric crystal 16 encased within the housing 12 and in close proximity to the well 14, and two terminal posts 18 and 20 attached to the outside of the housing 12 and electrically connected to the piezoelectric crystal.

The housing 12 is a molded plastic component. Although it could be made from a metal, the use of the molded plastic reduces manufacturing time and expense, does not require use of electrical insulators on the terminal posts, and produces a lighter weight device. The housing is preferably cylindrical in shape. This shape is easier to carry and to handle than a rectangular block shape. The piezoelectric crystal 16, the two terminal posts 18 and 20 and the electrical connectors between the crystal and the terminal posts are encased within and onto the housing during the molding thereof. A thin film of plastic separates the piezoelectric crystal from the well 14 thereby preventing dirt and moisture from fouling the operation of the piezoelectric crystal. Additionally, when a cylindrical shaped housing is used, the piezoelectric crystal 16 is most easily positioned, from a manufacturing standpoint, below the bottom of the well 14 as shown in FIG. 1. The piezoelectric crystal could, however, be placed substantially in any position in close proximity to the well.

The piezoelectric crystal shall be one which, upon deformation, generates a minimum of 1.5 amperes, an electric pulse sufficient to initiate an M6 or similar electric blasting cap.

In use, a blasting cap, like the M7 nonelectric blasting cap would be attached to a standard DFD at the coupling base of the DFD and then inserted into the well 14 of the housing 12 and secured therein as by threading the DFD into the base coupling thread 22 of the housing 12. Electrical cable 26 with at least two conductors 24 and 25 or two individual wires connected to the M6 or similar electric blasting cap, is connected to the terminal posts 18 and 20, one wire or conductor to each of said posts 18 and 20.

The housing 12 is then concealed or otherwise set out in accordance with the desired triggering method. Then, upon the happening of the triggering event, e.g. pulling on a trip wire or the passing of a person or vehicle, the DFD mechanically initiates the M7 blasting cap. When the M7 blasting cap detonates, the piezoelectric crystal is deformed thereby generating an electrical impulse sufficient to initiate the M6 electric blasting cap and subsequently causing the detonation of the munition.

Those skilled in the art will realize that the invention described above, may be used in a variety of applications other than those described above. It is also understood that the embodiments described above are merely examples of the present invention. Additional embodiments may be designed by those skilled in the art without departing from the spirit or scope of the invention

What I claim is:

1. An electric coupling, comprising:

a housing;

electrical energy generation means encased within said housing;

an open-ended cylindrical well within said housing for accepting means for initiating said electrical energy generation means; and first and second terminal posts attached to the outside of said housing and electrically connected to said electrical energy generation means.

2. The electric coupling of claim 1 wherein:

said electrical energy generation means comprises a piezoelectric crystal.

3. The electric coupling of claim 1 wherein:

said means for initiating is a non-electric blasting cap.

4. The electric coupling of claim 1 wherein:

said electrical energy generation means comprises a piezoelectric crystal;

said means for initiating is a non-electric blasting cap; and said non-electric blasting cap is in close proximity to said piezoelectric crystal whereby initiation of said non-electric blasting cap deforms said piezoelectric crystal thereby generating an electric impulse.

5. The electric coupling of claim 1 wherein:

said housing is molded from plastic and is cylindrical in shape.

* * * * *